United States Patent [19]
Hilbig

[11] 3,915,107
[45] Oct. 28, 1975

[54] BOW SEAL FOR SURFACE EFFECT SHIPS

[75] Inventor: Jack H. Hilbig, Chula Vista, Calif.

[73] Assignee: Rohr Industries, Inc., Chula Vista, Calif.

[22] Filed: Mar. 18, 1974

[21] Appl. No.: 452,365

[52] U.S. Cl. .............................................. 114/67 R
[51] Int. Cl.$^2$ .......................................... B63B 1/36
[58] Field of Search ............. 114/67, 66.5 R, 66.5 S, 114/66.5 P; 49/173; 187/66

[56] References Cited
UNITED STATES PATENTS

| | | | |
|---|---|---|---|
| 3,146,752 | 9/1964 | Ford | 114/66.5 R |
| 3,239,031 | 3/1966 | Lodige | 187/66 |
| 3,678,874 | 7/1972 | Flink | 114/66.5 P |

*Primary Examiner*—Trygve M. Blix
*Assistant Examiner*—Sherman D. Basinger
*Attorney, Agent, or Firm*—Patrick J. Schlesinger; Jay D. Gordon; Frank D. Gilliam

[57] ABSTRACT

A surface effect-type ship has vertically depending sidewall skirts that define a shock receiving cavity. A compound keel member is pivotally mounted to the forward end of the bow and is adapted to dampen the shock of waves incident thereon. The keel member includes a skeletal structure over which is clad a resilient and deformable skin. That skin deforms due to the wave pressure so as to present a concave surface to the incident waves. This surface partially diverts those waves into horizontal and vertical components. The vertical components may be cushioned by means of an air bag suitably positioned in the cavity behind the keel member. The vertical forces are transferred to the sidewalls and to some extent are canceled since each side of the keel acts to divert waves. Off center waves are dampened by the feature of the entire keel member being pivotable about its longitudinal axis. The keel is provided with a spring loaded slides in constant contact with the sidewalls.

2 Claims, 9 Drawing Figures

WAVE

000
BOW SEAL FOR SURFACE EFFECT SHIPS

BACKGROUND OF THE INVENTION

The present invention relates to a bow seal for a surface effect ship.

Surface effect ships, also known as gas cushion vehicles, are supported, at least in part, by a cushion of pressurized gas formed and contained between the vehicle body and the surface water. As these vehicles operate over turbulent water surfaces, they encounter waves which exert substantial forces on the vehicle body. These waves can be so powerful that heavy damage may be inflicted on the craft.

The new generation of boats are required to operate at speeds in the vicinity of 80–100 knots. Since the sidewalls are thin, they cannot develop such bouyant lift when entering a wave. Thus the wave is swallowed by the ship causing the bow seal to move up the height of the wave or plow a trough in the wave as the ship passes through. The action of the present flat plate type seal induces high accelerations and their resultant loads on the ship. These forces could conceivably be much in excess of the habitability limits.

The instant invention is designed to penetrate the wave as a conventional boat bow does, and at the same time lift up to allow the seal trailing edge to ride over the wave the horizontal and vertical acceleration forces could be reduced, this would then permit higher speeds within the habitability limits. The keels of the prior art, by contrast, are made of hinged plates which are exposed to the entire wave shock and transfer the full acceleration thereof into the boat.

SUMMARY OF THE INVENTION

The seal assembly is characterized by a compound skeleton consisting of a fore-aft beam pivoted at the forward end to the bow structure and a cross-beam at the aft end that extends between the side walls.

Side support arms extend from the hull structure to the keel cross-beam to attach or clad a resilient, deformable bow skin to the exterior of the compound keel skeleton. The side support arms are pivoted at their forward ends so as to pivot in a similar fashion as the fore-aft beam. The skin is fabricated from neoprene or the like.

Trailing fingers are connected to the aft end of the skin and extends aft from the cross-beam. An air bag may be positioned in the cavity defined by the sidewall skirts of the hull. That air bag serves to urge the keel member out from the cavity when the keel member deflects inwardly due to wave shocks and dampen the inward movement.

The keel member is connected to the boat structure with a spherical ball type joint that allows the keel member to pivot about the bow of the craft as well as rotate about the longitudinal axis of the keel member. This feature allows the trailing edge to contour the water surface. The loads induced by wave action are reacted by rollers or bearing members at the ends of the cross-beam into the sidewall skirts and also by the flexible skin into the boat structure.

In order to keep the seal near the surface when "off bubble," a bouyant compartment is made of the cross-beam structure.

The above and other aspects of the instant invention will be apparent as the description continues, and when read in conjunction with the appended drawings.

Figure 1:
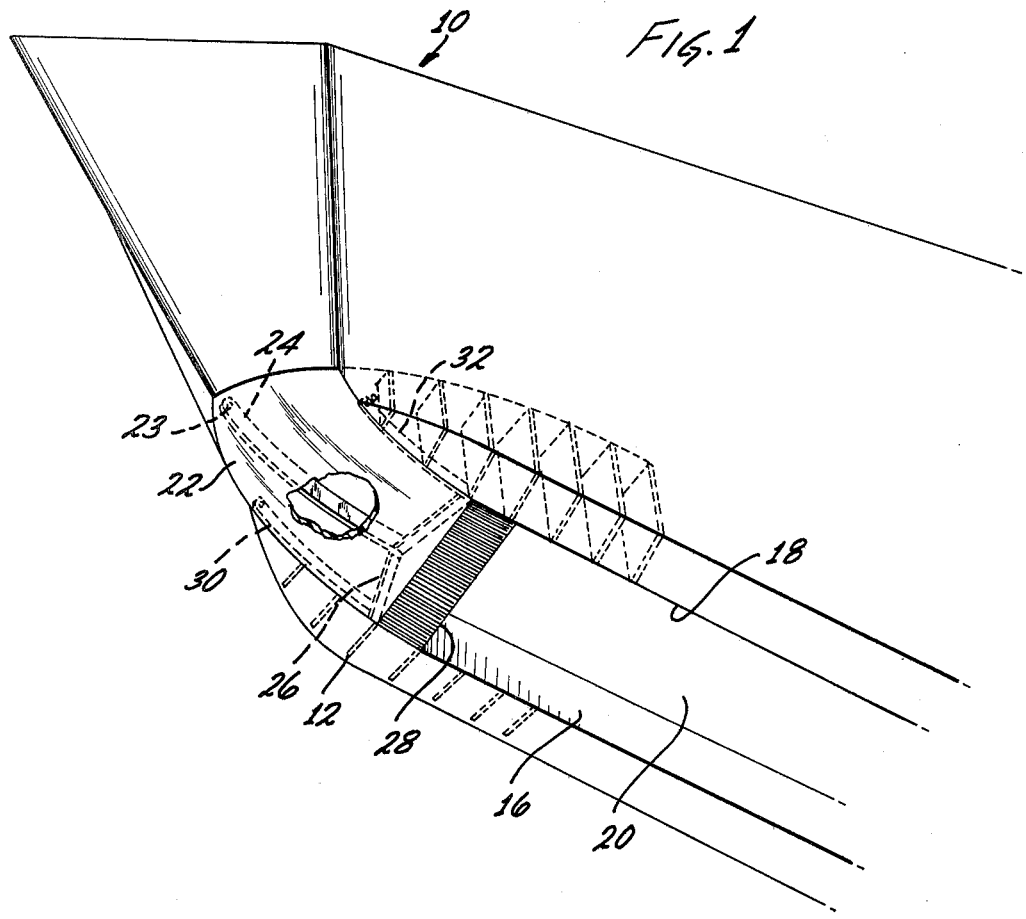
FIG. 1 is a perspective view of the keel incorporating the sealing structure of the present invention.
Figure 2:
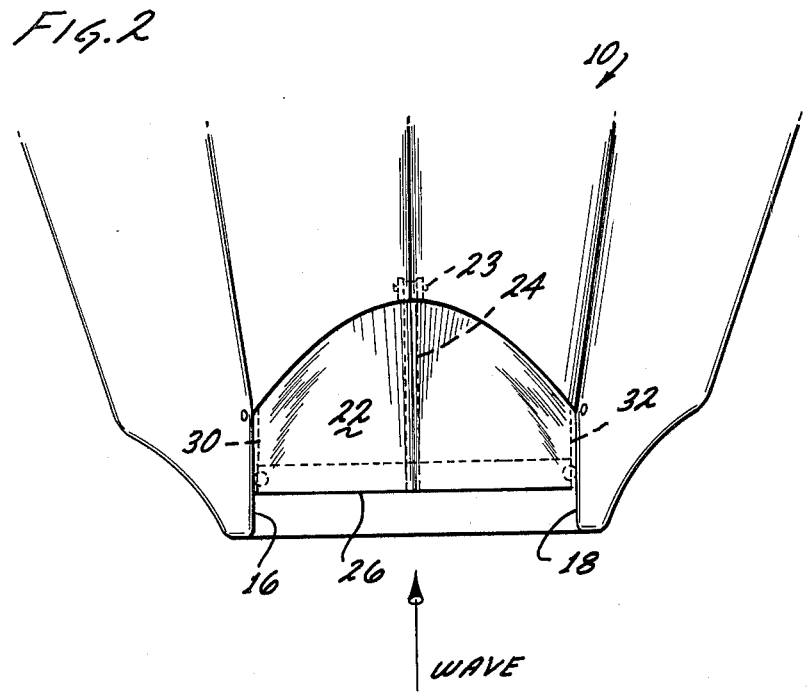
FIG. 2 is a front view of a surface effect ship as it cuts through a wave.
Figure 3:
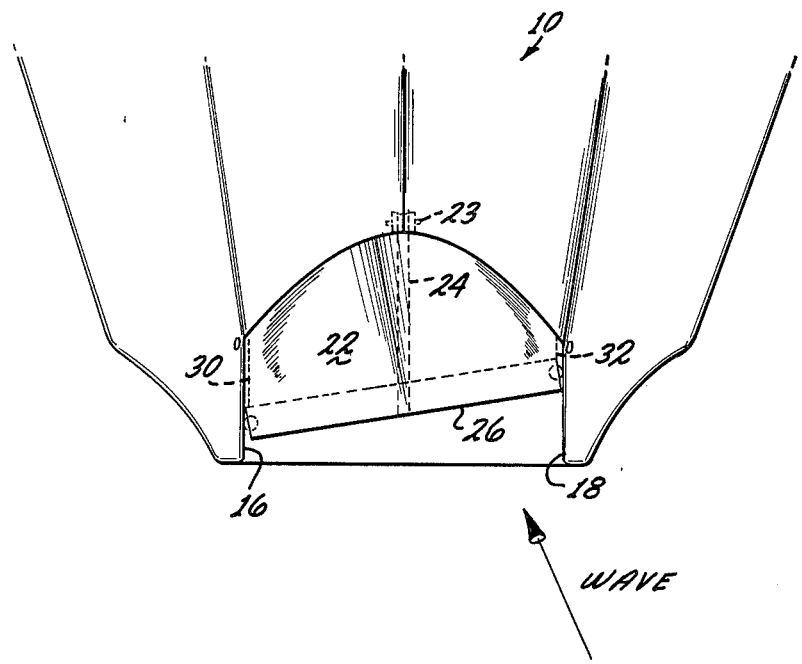
FIG. 3 is a perspective view showing the action of the keel as the boat cuts through an off-center wave.
Figure 4:
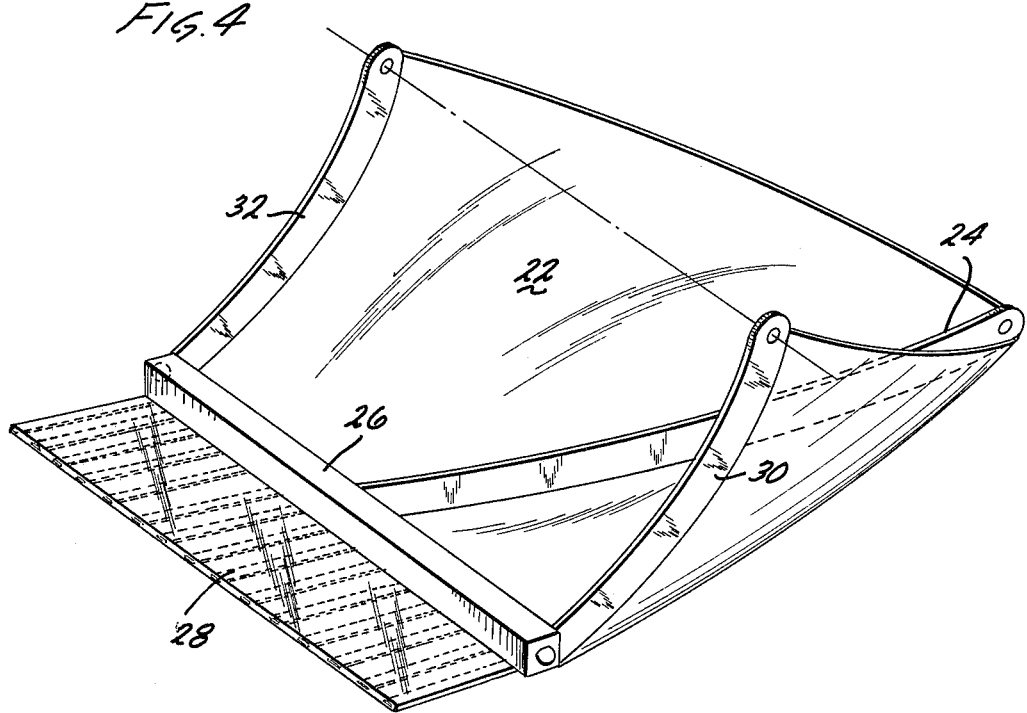
FIG. 4 is a perspective view of the keel structure.

The basic ship structure 10 embodying the instant invention is illustrated best in FIGS. 1–3. The internal skeletal structure of the ship is characterized by a series of parallel, spaced panels 12 assembled in pairs on the sides of the keel and gradually increasing in size from the foremost or front panel to the aftmost panel. The panels are rigidly affixed to the deck structure and are also connected to the sidewall skirts 16, 18 which are affixed to the deck structure and extend longitudinally along the underside of the keel the length of the ship, and progressively increasing in area (looking sideways at the structure) fore to aft.

The sidewall skirts 16, 18 define therebetween a compartment or cavity 20 in which the lifting forces are created by a layer of pressurized gas. The details of the structure necessary for the creation of that layer have been omitted since any functional apparatus will suit the purpose of the instant invention. Traditionally, the air pressure lifts the boat structure out of the water and permits its propulsion across the water surface at relatively rapid velocities. This motion is characterized by the skirts, in effect, "cutting" through the water.

As the ship cuts through the water, the collision with waves exerts forces on the ship 10. To absorb these shocks, the ship is fitted with a resilient, deformable skin 22 which extends from the leading edge of the bow to a distance of about three or four panels aft. In its relaxed position, the skin is disposed to form an integral part of the hydro-dynamic contour of the vessel. Oncoming waves strike the skin 22 and deform it inwardly so as to present a concave form to the wave. This deformation causes the wave to be partially diverted such that some of the force that would normally be incident longitudinally on the keel is turned outwardly or transverse to the longitudinal axis of the vessel. Where the wave strikes the center of the skin 22 it should be evident that each side of the skin deforms so as to equally divert the wave, in which case, the forces created thereby cancel each other out.

The skin 22 is clad over supporting structure defined by a fore-aft keel member 24. That member is connected to the tip of the bow by means of a ball joint type connector 23, for reasons which will be hereinafter explained. A cross-beam 26 is connected to the aft end of the keel member 24 and which beam spans the cavity 20 between the sidewalls skirts 16,18. That member is effective to provide aft support for the skin 22 and due to structure hereinafter described, maintains contact with the side wall skirts 16,18. A trailing panel 28 is affixed to the aft end of the skin 22 as well as the cross-beam 26. That panel functions to smooth out the water surface after the wave strikes the keel 10. Side beams 30,32 complete the skeletal structure and are pivoted to the sidewall skirts 16,18, and rigidly connected to the cross-beam 26. As seen in FIG. 1, the side beams 30,32 are positioned adjacent the sidewall skirts 16,18 and provide the side support for the skin 22. The side beams and the keel fore-aft member are all curved to generally conform to the contour of the keel of the vessel. The skin may be attached to the keel skeleton by any convenient means such as studs or bolts inserted through reinforced holes. The precise nature of this connection may vary as long as the connection is secure and structurally sound.

As previously mentioned, the fore-aft keel member 24 is connected to the keel via a ball joint connector 23. This connector permits motion of the two types. Firstly, the entire keel structure is permitted to pivot about that connector in the plane of the fore-aft member. The prime mover for this movement, is, of course, the oncoming wave. This action is, in effect, a collapse of the keel so as to absorb and dissipate the energy of the wave. Naturally, the skeletal structure must be returned to its shock absorbing station and to this end, resilient means, in the nature of a air bag (not shown) or other suitable means, is included between the deck undersurface and the keel skeleton. The exact nature of the means operative for this function forms no primary part of the instant invention and therefore the details and principles thereof may vary.

The second type motion permitted by the ball joint connector 23, shown in FIG. 2, is that of rolling about the fore-aft member 24. This motion is produced by the incidence of an off-center wave, the impact of which is not felt equally by both sides of the skin 22. By permitting the keel structure to roll, off-center waves can be effectively dampened and substantial shocks to the vessel can be avoided. As the keel rolls, the wave deforms the skin, in the area of impact, and diverts the wave so as to reduce the longitudinal forces imparted to the vessel.

Figure 5:
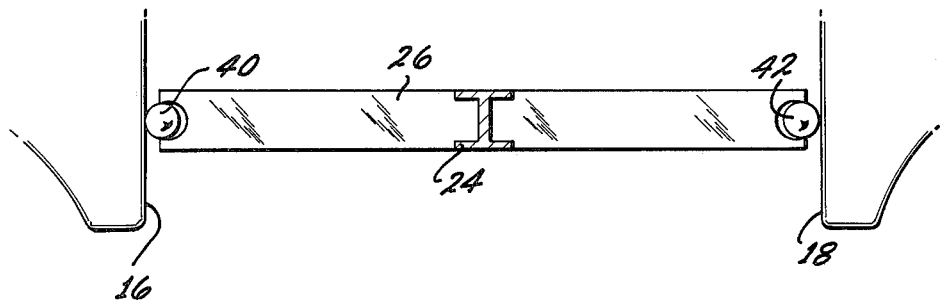
FIG. 5 is a front elevational view of the side restraints.

From the foregoing description, it should be evident there must be clearance between the sidewall skirts 16,18 and the side beams 30,32, conversely, there must be some means of movably connecting the cross-beam 26 to those skirts so that the keel is not free to bang into those skirts. The structures illustrated in FIGS. 4–8 are designed for that purpose. In FIG. 5, a pair of rollers 40,42 are connected to the extremities of the cross-beam 26, which rollers remain in constant contact with the skirts 16,18. Those rollers permit the cross-beam to move up and down the skirts 16,18 as well as pivoting about the fore-aft member.

Figure 6:
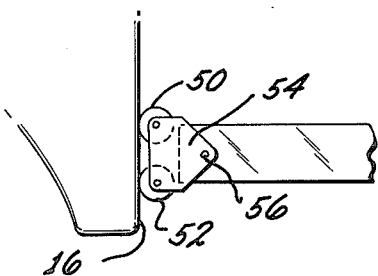
FIG. 6 is a front elevational view of an alternate embodiment side restraints.

A second embodiment, shown in FIG. 6, consists of a pair of rollers 50,52 rotatably connected to a bracket 54 which is pivotally connected at 56 to cross-beam 26.

Figure 7:
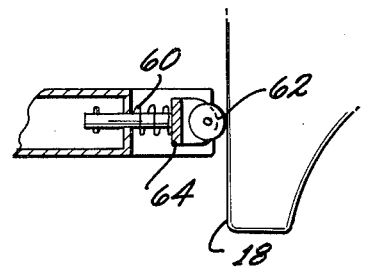
FIG. 7 is a front elevational view of an alternate embodiment side restraints.

In FIG. 7, a third embodiment illustrates a spring 60, loaded roller 62. The spring 60 acts on a bracket 64 on which the roller is journaled. The bracket 64 is connected to a support member which is anchored within the cross-beam 26.

Figure 8:
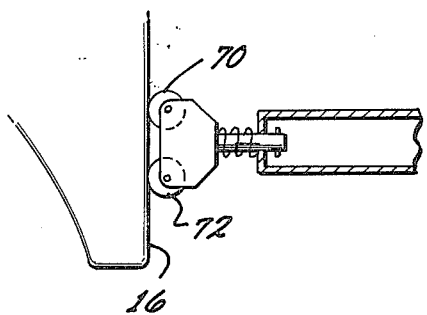
FIG. 8 is a front elevational view of an alternate embodiment side restraints.

In FIG. 8, we see a dual spring load roller, with the rollers 70,72 acting in concert to control the permitted motion of the keel member.

Figure 9:
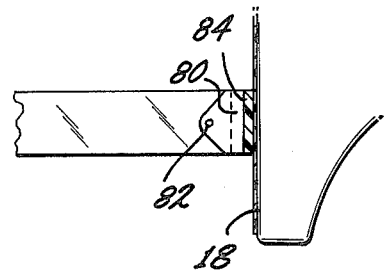
FIG. 9 is a front elevational view of an alternate embodiment side restraints.

In FIG. 9, a slider 80 is pivoted at 82 to the extremities of the cross-beam 26. The outer edge of that slider 80 is coated with a lubricious substance 84 such as teflon or nylon. The slider 80 permits the same motions as the rollers of the other embodiments.

It has been seen from the foregoing description that the structure embodying the present invention extends the operating habitability limits of the vessel. Ships encompassing this structure can operate when and as needed with little regard to the water surface condition.

Many changes may be made in details of the instant invention, in the method and materials of fabrication, in the configuration and assemblage of the constituent elements, without departing from the spirit and scope of the appended claims, which changes are intended to be embraced therewithin:

I claim:

1. In a surface effect-type ship of the type comprising vertically depending sidewall skirts defining therebetween a cavity to receive sea wave shocks, a compound keel member adapted to receive and absorb sea wave shocks said keel member being pivotable about the longitudinal axis thereof within said cavity by the incidence of off center sea waves, said keel member includes a fore-aft structural member pivotally mounted to the forward end of the bow of said ship, and a cross-beam connected to the aft end of said fore-aft member which cross-beam extends substantially between said sidewall skirts, a semi-rigid, flexible trailing member that extends aft from said compound keel, said sidewall members connected to said cross-beam which members conform to the curvature of said skirts, means operatively connected to said keel member which remain in constant contact with said skirts to transfer shocks thereto said means comprises spring loaded rollers connected at the side edge thereof and adjacent said skirt, which rollers remain in contact with said skirt as said keel pivots about its longitudinal axis.

2. In a surface effect-type ship of the type comprising vertically depending sidewall skirts defining therebetween a cavity to receive sea wave shocks, a compound keel member which comprises a keel skeleton pivotally mounted to the forward end of the bow of said ship, a resilient, deformable skin clad over said skeleton oriented to receive and cushion oncoming waves, said skin being deformable to the interior of said cavity to present a concave contour to the incident wave, thereby to partially divert said oncoming waves to vertical and horizontal component vector forces, said structure includes a fore-aft structural member pivotally mounted to the forward end of the bow of said ship, and a cross-beam connected to the aft end of said fore-aft member which cross-beam extends substantially between said sidewall skirts, a semi-rigid flexible trailing member extending aft from said compound keel, sidewall members connected to said cross-beam and said skin, which members follow the curvature of said skirts and means connected to said cross-beam in constant contact with said skirts to transfer forces thereto.

* * * * *